(12) United States Patent
Patnaik et al.

(10) Patent No.: US 11,922,362 B2
(45) Date of Patent: *Mar. 5, 2024

(54) CARGO INSPECTION, MONITORING AND SECUREMENT IN SELF-DRIVING TRUCKS

(71) Applicant: WAYMO LLC, Mountain View, CA (US)

(72) Inventors: Vijaysai Patnaik, San Francisco, CA (US); William Grossman, East Palo Alto, CA (US); Peter Strohm, East Palo Alto, CA (US)

(73) Assignee: Waymo LLC, Moutain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,870

(22) Filed: Jan. 6, 2023

(65) Prior Publication Data

US 2023/0153745 A1 May 18, 2023

Related U.S. Application Data

(63) Continuation of application No. 16/895,271, filed on Jun. 8, 2020, now Pat. No. 11,580,484.

(51) Int. Cl.
*G06Q 10/0832* (2023.01)
*B60R 11/04* (2006.01)
(Continued)

(52) U.S. Cl.
CPC .......... *G06Q 10/0832* (2013.01); *B60R 11/04* (2013.01); *B60W 60/00256* (2020.02);
(Continued)

(58) Field of Classification Search
CPC ...... G06Q 10/0832; G06Q 10/08; G06T 7/74; B60R 11/04; B60P 7/06; B60P 1/00
See application file for complete search history.

(56) References Cited

U.S. PATENT DOCUMENTS 9,260,896 B2 2/2016 Lloreda et al.
9,371,133 B2 6/2016 Mays
(Continued)

FOREIGN PATENT DOCUMENTS

CN 107850895 A 3/2018
DE 102014226108 A1 6/2016
(Continued)

OTHER PUBLICATIONS

Driver's Handbook on Cargo Securement, A Guide to the North American Cargo Securement Standard, pp. 1-141, 2003.
(Continued)

*Primary Examiner* — Rowina J Cattungal
(74) *Attorney, Agent, or Firm* — Botos Churchill IP Law LLP

(57) ABSTRACT

The technology relates to cargo vehicles. National, regional and/or local regulations set requirements for operating cargo vehicles, including how to distribute and secure cargo, and how often the cargo should be inspected during a trip. However, such regulations have been focused on traditional human-driven vehicles. Aspects of the technology address various issues involved with securement and inspection of cargo before a trip, as well as monitoring during the trip so that corrective action may be taken as warranted. For instance, imagery and other sensor information may be used to enable proper securement of cargo before starting a trip. Onboard sensors along the vehicle monitor the cargo and securement devices/systems during the trip to identify issues as they arise. Such information is used by the onboard autonomous driving system (or a human driver) to take corrective action depending on the nature of the issue.

21 Claims, 18 Drawing Sheets

(51) Int. Cl.
*B60W 60/00* (2020.01)
*G06T 7/73* (2017.01)
*G06V 20/59* (2022.01)

(52) U.S. Cl.
CPC .............. *G06T 7/74* (2017.01); *G06V 20/59* (2022.01); *B60R 2300/8006* (2013.01); *G06T 2207/10048* (2013.01); *G06T 2207/30268* (2013.01)

(56) References Cited

U.S. PATENT DOCUMENTS

| | | | |
|---|---|---|---|
| 9,958,872 B2 | 5/2018 | Anderson et al. | |
| 10,328,841 B2 | 6/2019 | Bika et al. | |
| 11,410,513 B2* | 8/2022 | Wong | G08B 13/19669 |
| 11,466,997 B1* | 10/2022 | Williams | G06Q 50/30 |
| 2017/0129383 A1* | 5/2017 | Bika | G01L 5/047 |
| 2017/0351268 A1* | 12/2017 | Anderson | H04W 4/44 |
| 2018/0097884 A1 | 4/2018 | Terwilliger et al. | |
| 2018/0129222 A1 | 5/2018 | Anderson et al. | |
| 2018/0175553 A1* | 6/2018 | Ghannam | H01R 24/70 |
| 2019/0050952 A1* | 2/2019 | Goldberg | A47J 36/32 |
| 2019/0056736 A1* | 2/2019 | Wood | G05D 1/0088 |
| 2019/0233034 A1 | 8/2019 | Viele et al. | |
| 2019/0235504 A1 | 8/2019 | Carter et al. | |
| 2019/0235519 A1 | 8/2019 | Carter et al. | |
| 2020/0137360 A1 | 4/2020 | Somers et al. | |
| 2020/0172096 A1* | 6/2020 | Lord | G01S 13/931 |

FOREIGN PATENT DOCUMENTS

| | | | |
|---|---|---|---|
| DE | 102016221422 A1 | 5/2018 | |
| DE | 102018213427 A1 | 2/2020 | |
| EP | 3721313 B1 * | 12/2021 | ........... G05D 1/0225 |

OTHER PUBLICATIONS

The Extended European Search Report for European Patent Application No. 21176466.7, dated Oct. 14, 2021.
The Extended European Search Report for European Patent Application No. 22180801.7, dated Sep. 19, 2022.
"§392.9 Inspection of cargo, cargo securement devices and systems.", [67 FR 61224, Sep. 27, 2002, as amended at 72 FR 55703, Oct. 1, 2007], 1 page.
Flamig, Heike, Autonomous Vehicles and Autonomous Driving in Freight Transport, Technische Universität Hamburg-Harburg—TUHH, Institute for Transport Planning and Logistics, 2016, pp. 365-385.
Hillier, Paul, Readiness for Self-driving Vehicles in Australia, ARRB Group Ltd Workshop Report, 2015, pp. 1-24.
Lutin, Jerome M., Not If, but When: Autonomous Driving and the Future of Transit, Journal of Public Transportation | scholarcommons. usf.edu/jpt, vol. 21 No. 1 [2018] pp. 92-103.
Murray, Dylan Davitt, et al., On the Societal Impact of Self-Driving Trucks, Worcester Polytechnic Institute, pp. 1-86, 2018.
Sentenac, et al., "Load Movement Measurement Using a Near-Infrared CCD Camera for Aircraft Cargo Surveillance", Emerging Technologies and Factory Automation, 2001, vol. 1, pp. 23-30.
Shahandashti, Mohsen, et al., Autonomous Vehicles and Freight Transportation Analysis, Department of Civil Engineering, The University of Texas at Arlington, Aug. 2019, pp. 1-111.
Shankwitz, Craig, Long-haul Truck Freight Transport and the Role of Automation: Collaborative Human—Automated Platooned Trucks Alliance (CHAPTA), Western Transportation Institute, Montana State University, Apr. 2017.
Witus, Gary, et al., Robotic Inspection for Vehicle-Borne Contraband, witusg@umich.edu; pp. 1-10, 1998.
Office Action from corresponding Chinese Application No. 202110635683.8 dated Jul. 8, 2023 (18 pages).

* cited by examiner

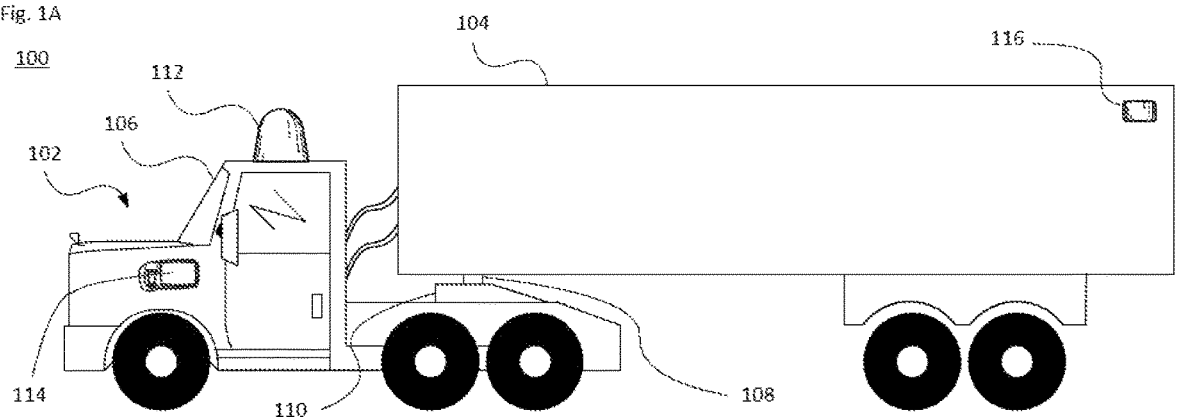
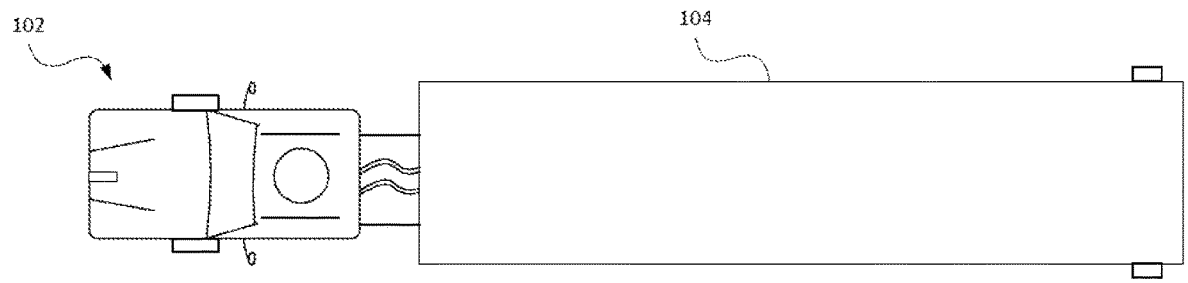

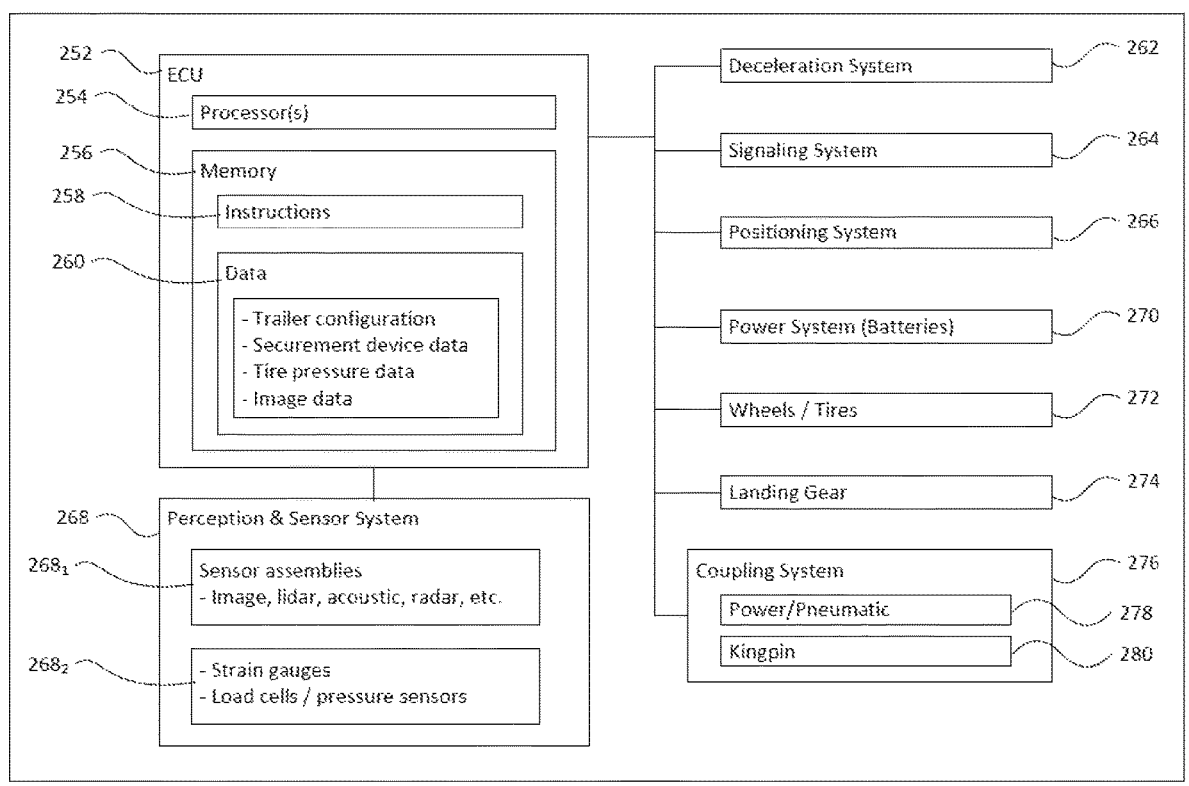

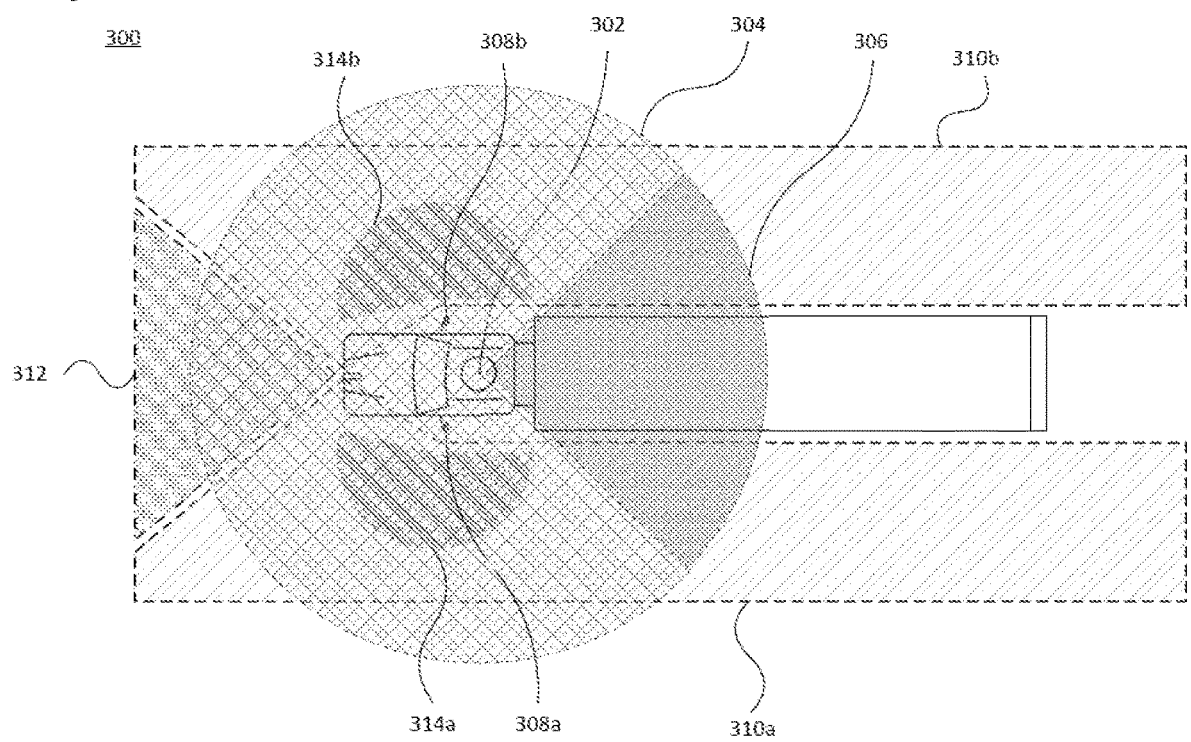

400

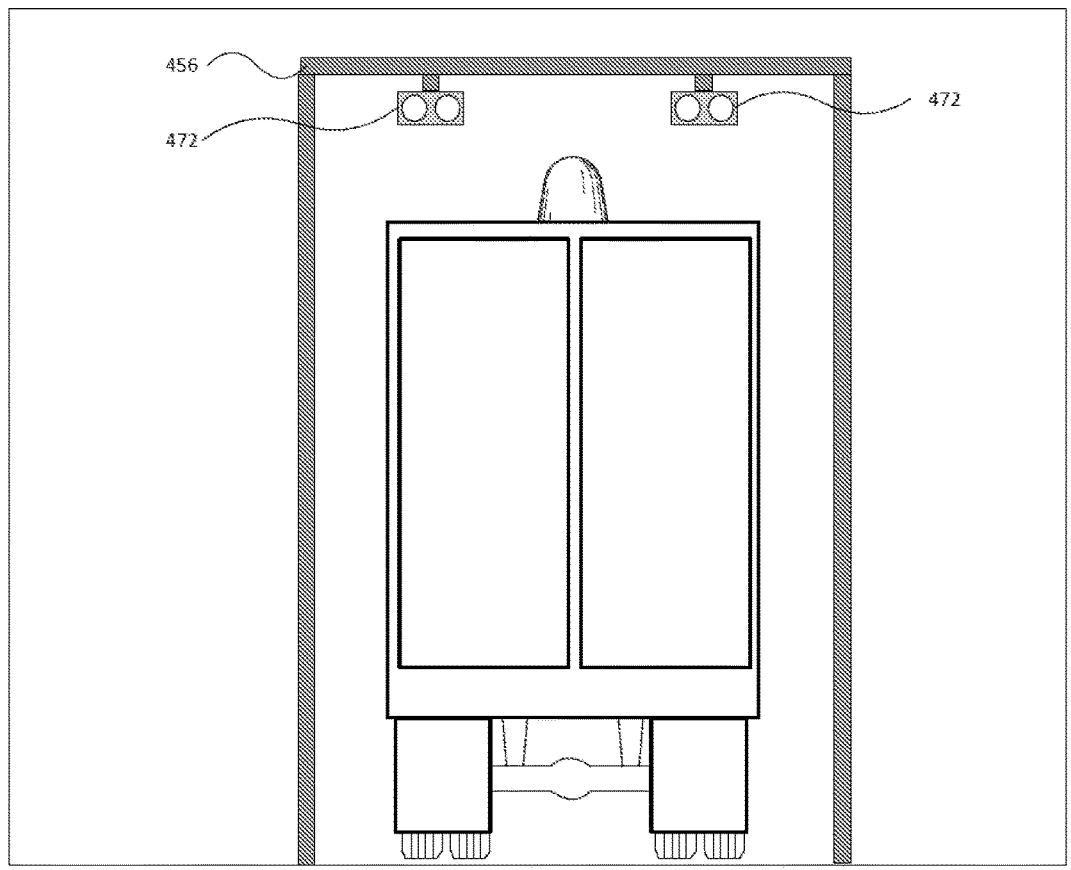

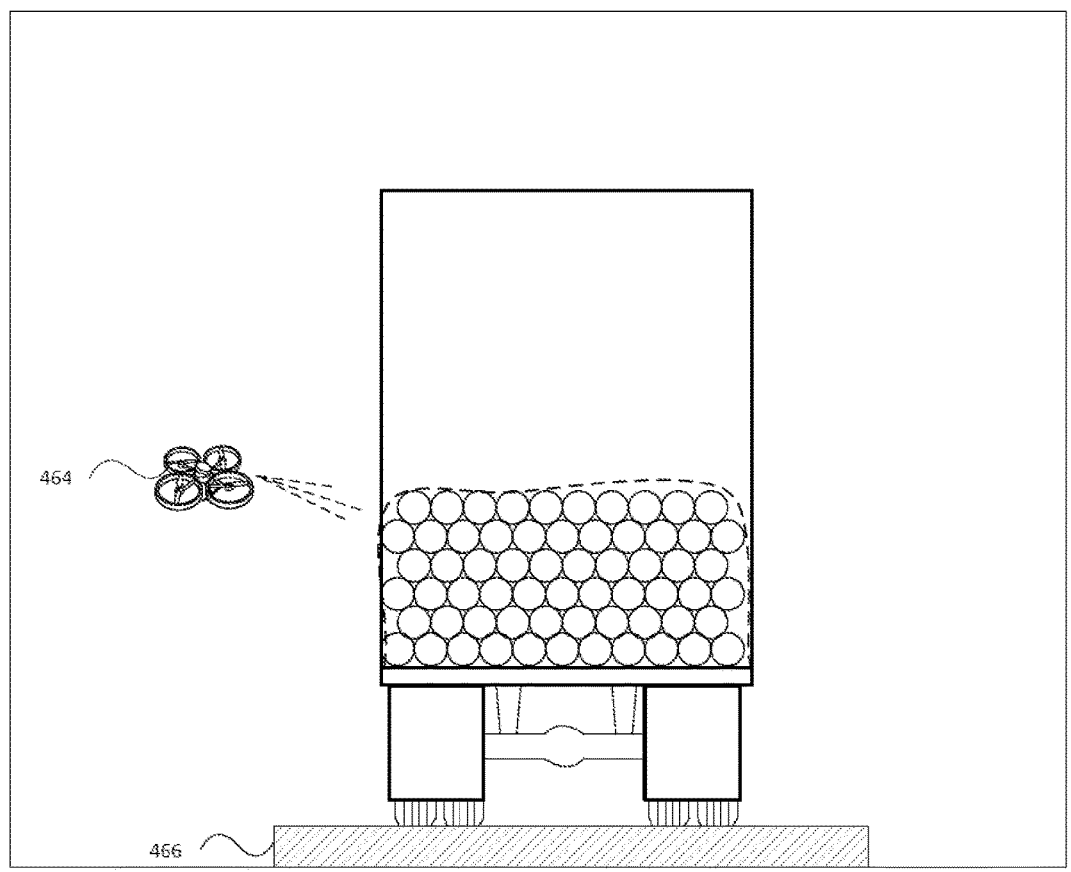

500

510

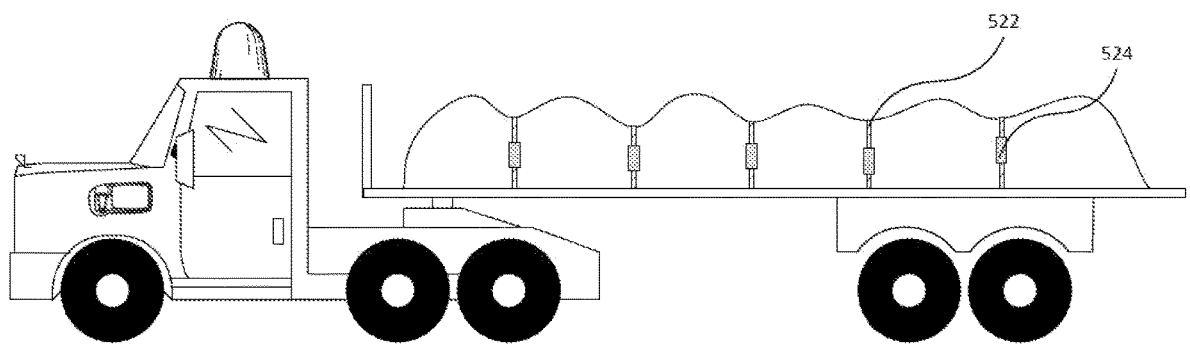

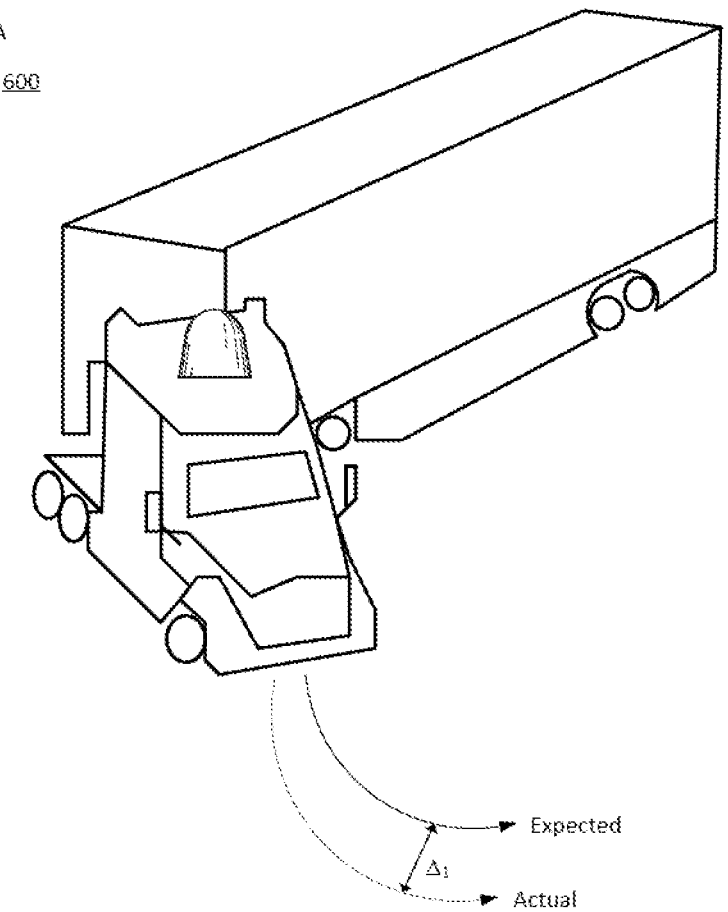

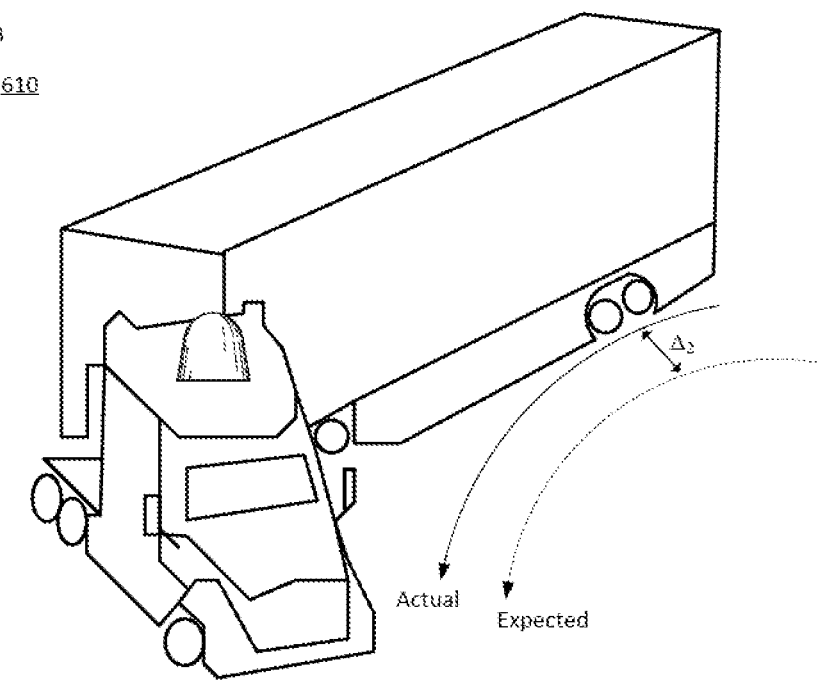

700

800

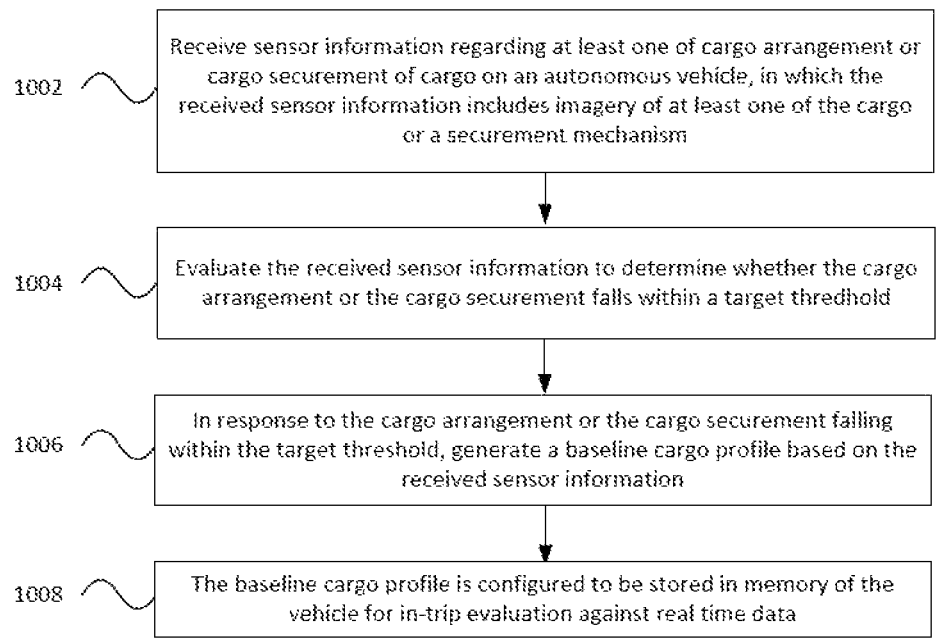

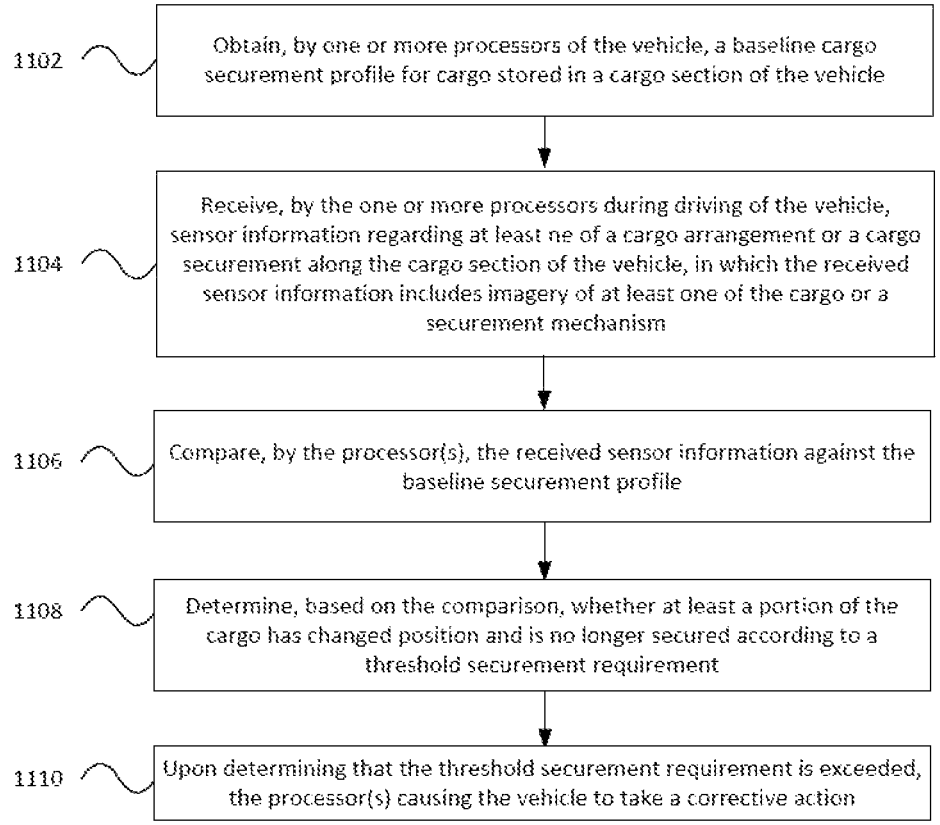

CARGO INSPECTION, MONITORING AND SECUREMENT IN SELF-DRIVING TRUCKS

CROSS-REFERENCE TO RELATED APPLICATIONS

This application is a continuation of U.S. application Ser. No. 16/895,271, filed Jun. 8, 2020, the entire disclosure of which is incorporated by reference herein.

BACKGROUND

Autonomous vehicle, such as vehicles that do not require a human driver, can be used to aid in the transport of cargo or passengers from one location to another. Such vehicles may operate in a fully autonomous mode, or a partially autonomous mode where a person may provide some driving input. There are various rules and regulations involving the transportation of cargo in order to promote safety. Different requirements may apply to different types of vehicles and different types of cargo. Regardless of vehicle or cargo type, it may be very challenging for a cargo vehicle operating in autonomous mode to meet certain regulatory requirements due to the reduced role or complete absence of a driver in the vehicle.

BRIEF SUMMARY

The technology relates to cargo vehicles, such as tractor-trailer and other container trucks, as well as flatbed trucks, etc. which can operate in a self-driving mode, although aspects are also applicable to traditional cargo vehicles controlled entirely by a human driver. National, regional and/or local regulations set requirements for operating cargo vehicles, including how to distribute and secure cargo, and how often the cargo should be inspected during a trip. However, such regulations have been focused on traditional human-driven vehicles.

Aspects of the technology address various issues involved with securement and inspection of cargo before a trip, as well as monitoring during the trip so that corrective action may be taken as warranted.

According to one aspect, a method of performing cargo evaluation for an autonomous vehicle is provided. The method comprises receiving sensor information regarding at least one of cargo arrangement or cargo securement of cargo on the autonomous vehicle, the received sensor information including imagery of at least one of the cargo or a securement mechanism; evaluating, by one or more processors, the received sensor information to determine whether the cargo arrangement or the cargo securement falls within a target threshold; and in response to the cargo arrangement or the cargo securement falling within the target threshold, generating, by the one or more processors, a baseline cargo profile based on the received sensor information. The baseline cargo profile is configured to be stored in memory of the autonomous vehicle for in-trip evaluation against real time data.

In one example, the method further comprises, when the cargo arrangement or the cargo securement does not fall within the target threshold, causing adjustment to the securement mechanism. The imagery may include stilt or Video imagery. The imagery may be captured using infrared (IR) illumination when the cargo is loaded into a closed container.

Evaluating the received sensor information may include comparing the imagery against a database of other images. Alternatively or additionally, evaluating the received sensor information may include generating a confidence value that the cargo is properly secured. Here, when the confidence value is below a threshold although the target threshold is satisfied, the method may further include sending the imagery for a second-tier review. The method may further comprise causing adjustment to at least one of a driving mode or a route of the vehicle prior to commencing delivery of the cargo.

According to another aspect, a method of performing cargo monitoring for a vehicle is provided. This method comprises obtaining, by one or more processors of the vehicle, a baseline cargo securement profile for cargo stored in a cargo section of the vehicle; receiving, by the one or more processors during driving of the vehicle, sensor information regarding at least one of a cargo arrangement or a cargo securement along the cargo section of the vehicle, the received sensor information including imagery of at least one of the cargo or a securement mechanism; comparing, by the one or more processors, the received sensor information against the baseline cargo securement profile; determining by the one or more processors, based on the comparing, whether at least a portion of the cargo has changed position and is no longer secured according to a threshold securement requirement; and upon determining that the threshold securement requirement is exceeded, the one or more processors causing the vehicle to take a corrective action.

The baseline cargo securement profile may be obtained prior to departure of the vehicle on a trip. Here, the baseline cargo securement profile may be obtained from a loading depot at which the cargo was loaded.

The corrective action may include one or more of (i) modifying driving behavior of the vehicle, (ii) re-routing to a nearest location where the cargo can be re-secured, (iii) pulling the vehicle over, or (iv) contacting a remote assistance service. In an example, the vehicle is operating in an autonomous driving mode and the corrective action is a driving action taken in the autonomous driving mode. In another example, determining that the threshold securement requirement is exceeded includes determining that the portion of the cargo has either shifted forward, rearward, laterally or has tipped. In a further example, the sensor information further includes Weight distribution or pressure distribution information.

The sensor information may include strain or tension information for one or more securement devices securing the cargo. In this case, the strain or tension information may include a change in color or shape of the one or more securement devices. The sensor information may be correlated with one or more vehicle signals. For instance, the one or more vehicle signals may at least one of a change in vehicle dynamics, a change in a suspension mechanism, a change in tire pressure, or a change in the pose of a portion of the vehicle.

According to yet another aspect of the technology, a vehicle is configured to operate in an autonomous driving mode. The vehicle includes a driving system including a steering subsystem, an acceleration subsystem and a deceleration subsystem to control driving of the vehicle in the autonomous driving mode. It also includes a perception system having a plurality of sensors, where each of the plurality of sensors is positioned along the vehicle. The vehicle further includes a control system operatively connected to the driving system and the perception system. The control system has one or more computer processors configured to: obtain a baseline cargo securement profile for cargo stored in a cargo section of the vehicle; receive, during driving of the vehicle, sensor information regarding at least one of a cargo arrangement or a cargo securement along the cargo section of the vehicle, the received sensor information include imagery of at least one of the cargo or a securement mechanism; compare the received sensor information against the baseline cargo securement profile: determine, based on the comparison, whether at least a portion of the cargo has changed position and is no longer secured according to a threshold securement requirement; and upon determination that the threshold securement requirement is exceeded, cause the vehicle to take a corrective action.

BRIEF DESCRIPTION OF THE DRAWINGS

FIGS. 1A-B illustrate an example cargo-type vehicle configured for use with aspects of the technology.

FIGS. 2A-B are block diagrams of systems of an example cargo-type vehicle in accordance with aspects of the technology.

FIG. 3 illustrates example sensor fields of view for a cargo-type vehicle in accordance with aspects of the disclosure.

FIGS. 4A-D illustrate example scenarios for pre-trip cargo evaluation in accordance with aspects of the technology.

FIGS. 5A-D illustrate examples of cargo securement in accordance with aspects of the technology.

FIGS. 6A-B illustrate examples of positional variance in accordance with aspects of the technology.

FIG. 10 illustrates an example method in accordance with aspects of the technology.

FIG. 11 illustrates another example method in accordance with aspects of the technology.

DETAILED DESCRIPTION

Figure 2A:
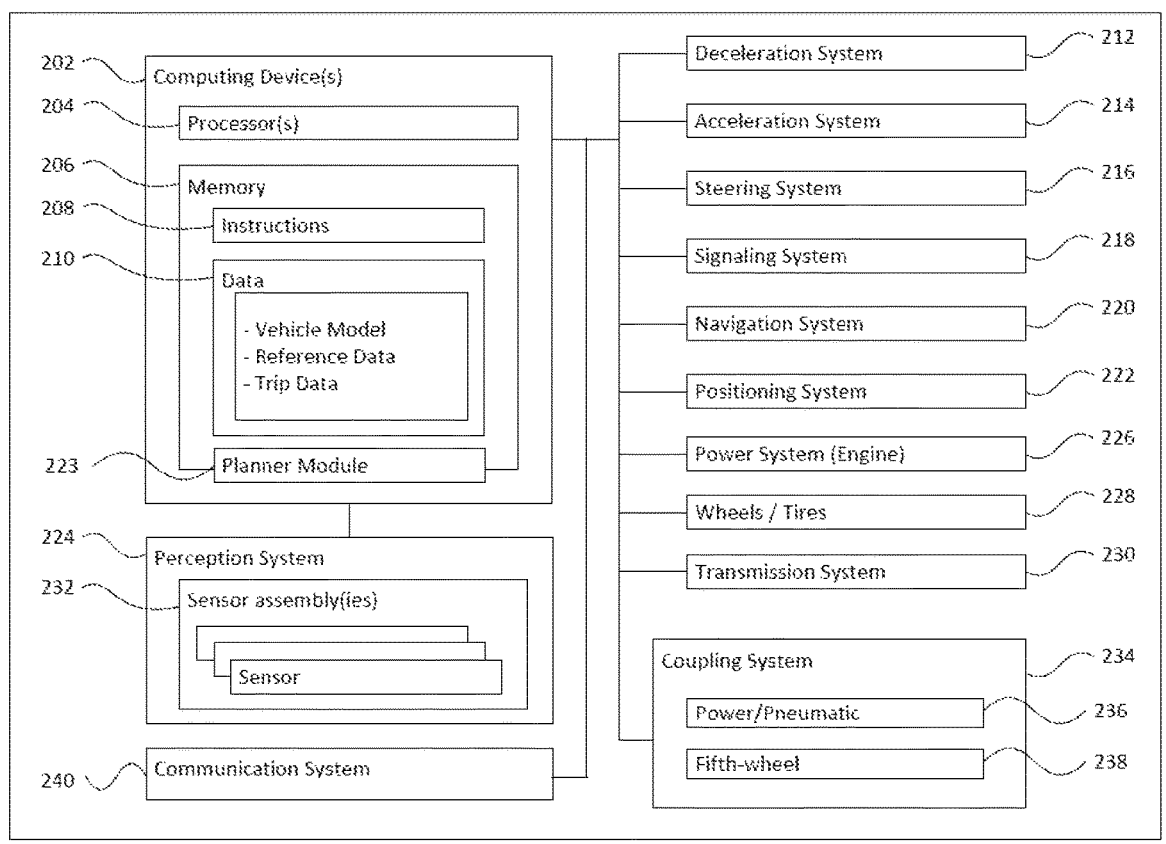

It may be challenging to meet existing requirements for autonomous vehicles that operate during some or all of a trip without direct human control over driving operations. Features of the technology relate to self-driving trucks and/or fleet management system that (i) provides for proper securement of cargo before starting a trip: (ii) monitors the cargo and securement devices/systems during the trip and identities issues as they arise; and (iii) is able to take corrective action depending on the nature of the issue.

Example Vehicle Systems

FIGS. 1A-B illustrate an example cargo vehicle 100, such as a tractor-trailer truck, that may be used according to aspects of the technology. FIG. 1A is a side view and FIG. 1B is a top-down view. The truck may include, e.g., a single, double or triple trailer, or may be another medium or heavy duty truck such as in commercial weight classes 4 through 8. As shown, the truck includes a tractor unit 102 and a single cargo unit Or trailer 104. The trailer 104 may be fully enclosed, open such as a flatbed, or partially open depending on the type of goods or other cargo to be transported. In this example, the tractor unit 102 includes the engine and steering systems (not shown) and a cab 106 for a driver and any passengers. In a fully autonomous arrangement, the cab 106 may not be equipped with seats or manual driving components, since no person may be necessary. In other configurations, the cargo vehicle may be a panel van, a reefer with a refrigerated trailer, etc.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 110, known as a fifth-wheel, that is mounted rearward of the cab 106. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor and/or trailer may have one or more sensor units 112, 114 and 116 disposed therealong. For instance, one or more sensor units 112 may be disposed on a roof or top portion of the cab 106, and one or more side sensor units 114 may be disposed, e.g., on left and/or right sides of the cab 106. In some cases, such sensor units may be located on the top of on the bottom of, adjacent to, or in place of rear-view mirrors. Sensor units may also be located along other regions of the cab 106, such as along the front bumper or hood area, in the rear of the cab adjacent to the fifth-wheel, underneath the chassis, etc. The trailer 104 may also have one or more sensor units 116 disposed therealong, for instance along a side panel, front, rear, roof and/or undercarriage of the trailer 104.

By way of example, each sensor unit may include one or more sensors, such as lidar, radar, camera (e.g., optical or infrared), acoustical (e.g., microphone or sonar-type sensor), pressure (e.g., piezoelectric or mechanical), inertial (e.g., accelerometer, gyroscope, etc.) or other sensors (e.g., positioning sensors such as GPS sensors). Acoustical sensors near the tires (e.g., on the vehicle chassis near the axles or wheel wells) can detect the sounds of the tires as the vehicle drives autonomously along the roadway, while such sensors along the trailer may detect cargo movement or displacement. A change in sound may indicate a change in the status of the cargo. Pressure sensors can be used to detect instantaneous tire pressure or the weight distribution of cargo. While certain aspects of the disclosure may be particularly useful in connection with specific types of vehicles, the vehicle may be any type of vehicle including, but not limited to, trucks and other cargo vehicles, buses, vans, construction vehicles, emergency vehicles, passenger vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level has no automation and the driver makes all driving-related decisions. The lowest semi-autonomous mode. Level 1, includes some drive assistance such as cruise Control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode can include both partial and full autonomy.

FIG. 2A illustrates a block diagram 200 with various components and systems of an exemplary vehicle, such as cargo vehicle 100, to operate in an autonomous driving mode. As shown, the block diagram 200 includes a control system having one or more computing devices 202. The control system may constitute an electronic control unit (ECU) of a tractor unit of the cargo vehicle 100 or other onboard processing system. The computing devices 202 contain one or more processors 204, memory 206 and other components typically present in general purpose computing devices. The memory 206 stores information accessible by the one or more processors 204, including instructions 208 and data 210 that may be executed or otherwise used by the processor(s) 204. For instance, the data 210 may include a model of the vehicle, such as a kinematic model for both the tractor and trailer(s). Alternatively or additionally, the data 210 may include reference data and trip data. The reference data may include reference images Or other information regarding proper (or improper) cargo configurations and conditions to be used for mid-trip cargo monitoring. By way of example, reference images may be taken at a depot, warehouse or other facility at which the cargo was loaded onto the vehicle or into a closed container. This may include capturing imagery using infrared (IR) illumination in a low-light condition. The trip data can include real-time data regarding the cargo, securement devices and other vehicle information obtained during a trip. The computing system is able to control overall operation of the vehicle when operating in an autonomous driving mode according to the vehicle model, the reference data and/or the trip data.

The memory 206 stores information accessible the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics, detected sensor data, reference data and the like, which may be on board the vehicle or remote, depending on the implementation.

The processors 204 may be commercially available CPUs. Alternatively, each processor may be a dedicated device such as an ASIC or other hardware-based processor. Although FIG. 2A functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination, for selecting an intermediate section of the route, or for making modifications to various driving aspects in view of current or expected environmental conditions along the route.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from map information and the navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing, the fuel supplied to the engine, changing gears, and/or by applying brakes by deceleration system 212), change direction (e.g., by turning the front or other wheels of vehicle 100 by steering system 216), and signal such changes (e.g. by lighting turn signals of signaling system 218). Thus, the acceleration system 214 and deceleration system 212 may be apart of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes one or more sensor assemblies 232 for detecting objects external to the vehicle. The detected objects may be other vehicles, obstacles in the roadway, traffic signals, signs, trees, etc. By way of example only, the sensor assemblies 232 of the perception system 224 may each include one or more lidar sensors, radar units, cameras (e.g., optical imaging devices, with or without a neutral-density (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their Characteristics such as location, orientation, size, shape, type (for instance, vehicle, pedestrian, bicyclist, etc.), heading, speed of movement relative to the vehicle, etc. In addition, the sensors may detect road conditions, like standing water, ice, or potholes.

The perception system 224 may also include other sensors within the vehicle to detect objects and conditions within the vehicle, such as in the trailer or passenger compartment. For instance, such sensors may detect, e.g., cargo, passengers, pets, etc., as well as conditions within the vehicle or a component thereof, and/or outside the vehicle such as temperature, humidity, etc. Still further, sensors of the perception system 224 may measure the rate of rotation of the wheels 228, an amount or a type of braking by the deceleration system 312, pressure, weight distribution, alignment and other factors associated with the cargo or equipment of the vehicle itself. Depending on the vehicle configuration, the longitudinal position of the kingpin of the tractor may be adjustable. One or more sensors may be arranged to detect the specific longitudinal position of the kingpin.

The raw data from the sensors and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223. In addition, the computing devices 202 may preform calibration of individual sensors, all sensors in a particular sensor assembly, or between sensors in different sensor assemblies or other physical housings.

As noted above, one or more sensors of the perception system 224 may be incorporated into sensor assemblies or housings. In one example, these may be integrated into the side-view mirrors on the vehicle, e.g., as sensor towers integrated into the side-view minors on the truck, farm equipment, construction equipment or the like. In another example, other sensors may be part of the roof-top housing 112, or other sensor housings or units 114 and/or 116. The computing devices 202 may communicate with the sensor assemblies located on or otherwise distributed along the vehicle. Sensor assemblies 232 may also be positioned at different locations on the tractor unit 102 or on the trailer 104, as noted above with regard to FIGS. 1A-B. The computing devices 202 may communicate with the sensor assemblies located on both the tractor unit 102 and the trailer 104. Each assembly may have one or more types of sensors such as those described above.

Also shown in FIG. 2A is a coupling system 234 for connectivity between the tractor unit and the trailer. The coupling system 234 may include one or more power and/or pneumatic connections 236 and a fifth-wheel 238 at the tractor unit for connection to the kingpin of the trailer.

A communication system 240 is also shown as part of vehicle system 200. For instance, the communication system 240 may also include one or more wireless configurations to facilitate communication with other computing devices, such as passenger computing devices within the vehicle, computing devices external to the vehicle such as in another nearby vehicle on the roadway, and/or a remote server system. Such connections may include short range communication protocols such as Bluetooth™, Bluetooth™ low energy (LE), cellular connections, as well as various configurations and protocols including the Internet, World Wide Web, intones, virtual private networks, wide area networks, local networks, private networks using communication protocols proprietary to one or more companies, Ethernet, WiFi and HTTP, and various combinations of the foregoing.

FIG. 2B illustrates an example block diagram 250 of trailer-based subsystems, such as might be included in trailer 104 of FIGS. 1A-B. As shown, the system includes an ECU 252: of one or more computing devices, such as computing devices containing one or more processors 254, memory 256 and other components typically present in general purpose computing devices. The memory 256 stores information accessible by the one or more processors 254, including instructions 258 and data 260 that may be executed or otherwise used by the processor(s) 254. The descriptions of the processors, memory, instructions and data from FIG. 2A apply to these elements of FIG. 2B. By way of example only, the data 260 may include trailer configuration information (e.g., size, shape, weight, etc.), tire pressure data, information about securement devices used to secure the cargo, image data for the cargo, securement devices and/or areas of the trailer, and the like. This may include reference data obtained at a depot, warehouse or other facility at which the cargo was loaded onto the vehicle or into a closed container, as well as real-time data obtained during a trip.

The ECU 252 is configured to receive information and control signals from the trailer unit. The onboard processors 254 of the ECU 252 may communicate with various systems of the trailer, including a deceleration system 262, signaling system 264, and a positioning system 266. The ECU 252 may also be operatively coupled to a perception and sensor system 268 and a power system 270 (for example, a battery power supply) to provide power to local components.

As shown, the perception and sensor system 268 may include one or more sensor assemblies 2681, for instance to detect objects and conditions in the environment around the trailer, as well as along the trailer itself. These sensor assemblies may include image sensors, lidar, radar, acoustic sensors, etc. The perception and sensor system 268 may also include one or more sensor elements $268_2$, which are used to detect real-time status information about the cargo. For instance, strain gauges can be coupled to or integrated into securement devices, such as to detect whether straps or other securement devices are properly restraining the cargo. And load cells or pressure sensors (e.g., operatively coupled to the suspension system of the trailer) can indicate whether cargo has shifted position within the trailer.

Some or all of the wheels/tires 272 of the trailer may be coupled to the deceleration system 262, and the processors 254 may be able to receive information about tire pressure, balance, temperature, wheel speed and other factors that may impact driving in an autonomous mode, and to relay that information to the processing system of the tractor unit. The deceleration system 262, signaling system 264, positioning system 266, perception system 268, power system 270 and wheels/tires 272 may operate in a manner such as described above With regard to FIG. 2A.

The trailer also includes a set of landing gear 274 as well as a coupling system 276. The landing gear provides a support structure for the trailer when decoupled from the tractor unit. The coupling system 276, which may be a part of coupling system 234, provides connectivity between the trailer and the tractor unit. Thus, the coupling system 276 may include a connection section 278 (e.g., for power and/or pneumatic links). As shown, the coupling system 276 also includes a kingpin 280 configured for connectivity with the fifth-wheel of the tractor unit.

As noted above, various sensors may be located at different places around the vehicle (see FIGS. 1A-B) to gather data from different parts of the external environment and/or the vehicle itself. Certain sensors may have different fields of view (FOV) depending on their placement around the vehicle and the type of information they are designed to gather. For instance, different lidar sensors may be used for near (short range) detection of objects adjacent to the vehicle (e.g., less than 2-10 meters) or the trailer itself, while others may be used for far (long range) detection of objects a hundred meters (or more or less) in front of the vehicle. Mid-range lidars may also be employed. Multiple radar units may be positioned toward the front or rear of the vehicle for long-range object detection. And cameras may be arranged to provide good visibility around the vehicle and of the trailer or cargo being hauled. Depending on the configuration, certain types of sensors may include multiple individual sensors with overlapping fields of view. Alternatively or additionally, other sensors may provide redundant 360° fields of view. In addition to detecting objects in the environment external to the vehicle, these sensors may be used to determine the vehicle's actual pose including, e.g., the orientation of the trailer to the tractor unit of a cargo vehicle.

FIG. 3 provides one example 300 of sensor fields of view relating to the sensors, such as those illustrated in FIG. 1B. As illustrated in example 300 of FIG. 3, the lidar(s) in the rooftop sensor housing 302 may have a FOV 304. Here, as shown by region 306, the trailer or other articulating portion of the vehicle may provide signal returns (and may partially or fully block a rearward view of the external environment in certain situations). Long range lidar the left and right sides 308a, 308b of the tractor unit have FOVs 310a and 310b. These can encompass significant areas along the sides and front of the vehicle. As shown, there may be an overlap region 312 of their fields of view in font of the vehicle. The overlap region 312 provides the perception system with additional information About a very important region that is directly in front of the tractor unit. This redundancy also has a safety aspect. Should one of the long range lidar sensors suffer degradation in performance, the redundancy would still allow for operation in an autonomous mode. Short range lidars on the left and right sides of the vehicle have smaller FOVs 314a and 314b. Both types of lidars may be co-located in a single housing. A space is shown between different fields of view for clarity in the drawing; however, in actuality there may be no break in the coverage. The specific placements of the sensor assemblies and fields of view is merely exemplary, and may be different depending on, e.g., the type of vehicle, the size of the vehicle, FOV requirements, etc.

Example Implementations

In view of the structures and configurations described above and illustrated in the figures, various aspects will now be described in accordance with aspects of the technology.

Complying with cargo-related rules and regulations may be complicated for vehicles operating in an autonomous driving mode due to a variety of reasons. Thus, addressing such issues involves creative and flexible solutions. In many situations, prior to leaving a depot or other facility, a visual assessment of the cargo and vehicle may be performed. This may not occur, for instance, when the autonomous receives a closed container (trailer), such as a reefer (a refrigerated trailer) or a dry van. Regardless, during a trip the vehicle itself will need to evaluate cargo placement, shifting and other issues.

Figure 4A:
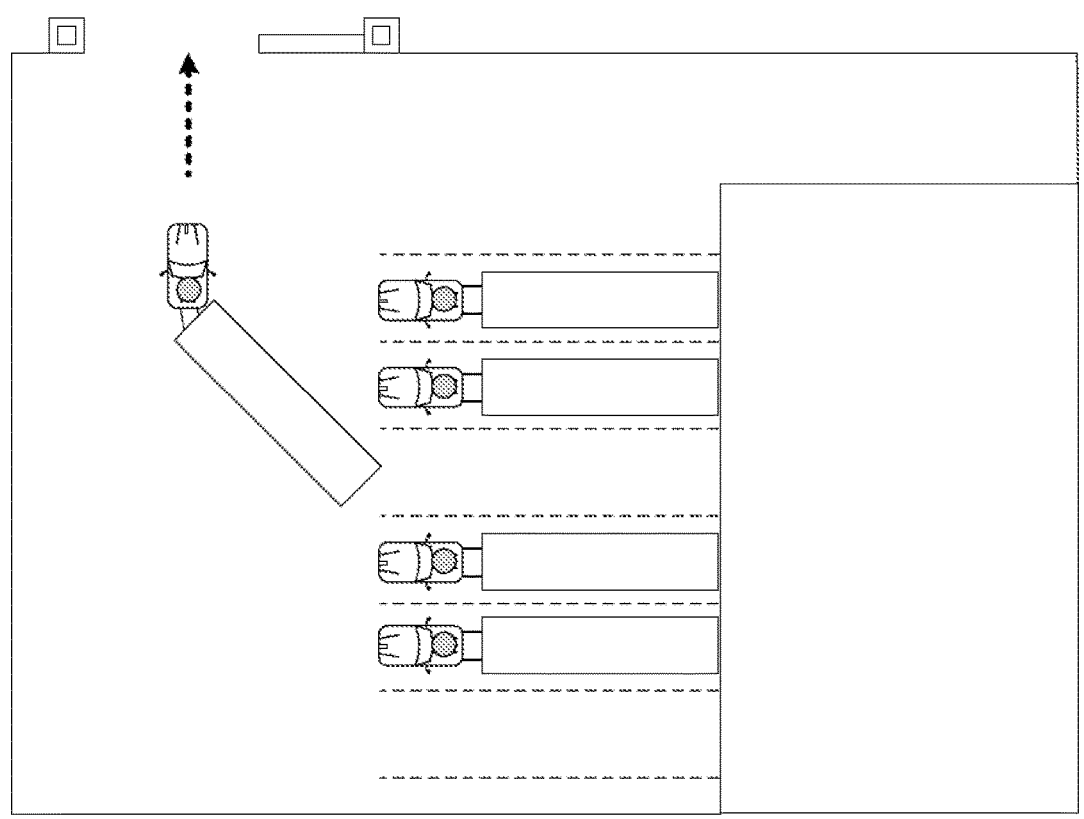

FIG. 4A illustrates an example 400 of an autonomous tractor-trailer cargo truck exiting a depot. Prior to departure (e.g., as cargo is being loaded and secured) or as part of the departure process (e.g., as the truck passes through a gate or inspection arrangement), the cargo may be evaluated. In one scenario, pre-trip cargo securement can be done by human operators. Automated checking and/or expert review (second-tier review) may be used to ensure proper securement, because it can be much more effective and efficient to make any adjustments prior to beginning the trip.

Figure 4B:
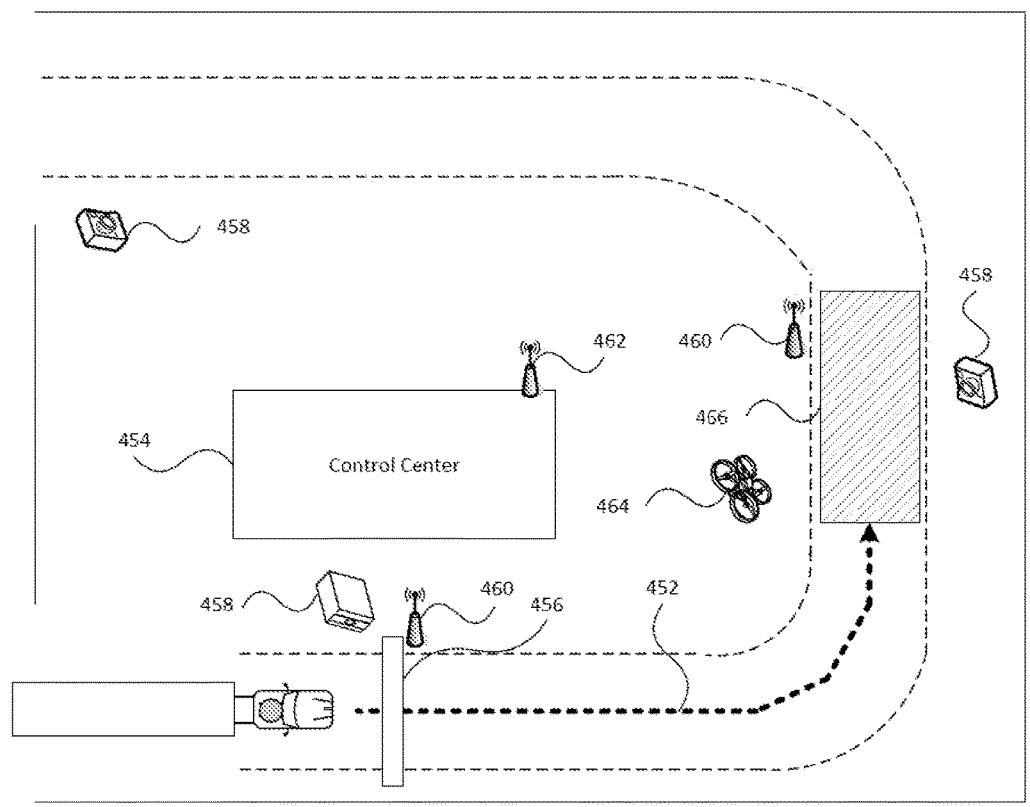

Example 450 of FIG. 4B illustrates one departure arrangement. In example 450, the vehicle may follow a route 452 at the depot, for instance under the direction of an inspection officer or a computer system of control center 454. As shown, the vehicle may first or subsequently proceed through area 456, where visual and other inspections are performed. Cameras, lidar, thermal imagers and/or other sensors 458 may be positioned at various locations around the weigh station facility. Some or all of the inspection information may be relayed to the control center 454 and/or the vehicle via wireless transmitters or transceivers 460. In this example, the control center 454 has a transceiver 462 to provide instructions or other information to the vehicle and/or to the various inspection elements, including, e.g., a drone or other robot-type inspection unit 464. The instructions may cause the truck to pass under a sensor suite of the area 456 or over a weight distribution platform 466.

FIG. 4C illustrates a view 470, in which the sensor suite of area 456 may include one or more sets of cameras 472 to take images of the cargo. And as illustrated in the example 480 of FIG. 4D, drone 464 or another autonomous or remotely controlled device may inspect different parts of the vehicle, including cargo straps or other fasteners, interior of the trailer, etc., with optical or infrared cameras, lidar and/or other sensors. Imagery could be captured by one or both of depot cameras and on-track cameras (e.g., trailer-based cameras). As discussed further below, on-truck cameras would allow continuous monitoring during the trip, which could catch unstable cargo in route, and potentially avoid the need to stop a set number of miles to comply with certain regulations. The imagery and other information collected pre-trip may be stored at the depot control center 454 and transmitted to the vehicle prior to departure, where it can be stored as reference data 210 (FIG. 2A) and/or data 260 (FIG. 2B).

In the pre-trip inspection, in one scenario the system may not focus on the cargo arrangement itself; rather, it may focus on whether the cargo is secured properly or not. Thus, it may be necessary to obtains a view(s) of the cargo securement devices on the trailer, compare that view to a database of images where a similar cargo securement device was used and how it looked (e.g., taut vs. loose) and apply either heuristic or ML techniques to detect anomalies.

Automated checking may involve taking still or video images and analyzing them. This can include comparing the imagery against a database of other images. By way of example, using machine learning algorithms, the system can use this comparison to confirm that the cargo is properly secured (e.g., within some target threshold) or that there is a deficiency to be rectified. This way, the system could leverage cargo-loading information from fleet-wide operations, as imagery from other vehicles could be incorporated into the database. Thus, information from similarly loaded vehicles may be used as a baseline or to otherwise identify possible deviations from acceptable securement parameters, in particular as a baseline cargo profile.

According to one aspect, with unobstructed lidar and camera views of the sides of the cargo, the system could have an automatic predeparture check that Makes sure the length and Width of the cargo are road legal (i.e., do tot go beyond some dimensions as defined by a regulation). This could be performed with a bounding box evaluation of the cargo. Additionally or alternatively, the system may define standard positions/sizes of cargo that are deemed appropriate, determine the cargo's positions/sizes, and compare the two to identify any deviations from the standard.

In one example, the automated checking process may generate a confidence value that the cargo is properly secured, or that it requires some particular adjustment. For instance, there may be different confidence ratings (e.g., high, medium or low) or a simple pass/fail confidence. Regardless of the granularity of the confidence, if it exceeds a threshold (e.g., rated as high or pass), the cargo is considered properly secured. And if it does not exceed a threshold (e.g., low or fail), then modifications to the securement mechanisms may be made as appropriate. However, in situations where the confidence value is not sufficiently high, but no particular adjustments are readily identified (e.g., a medium confidence), the imagery may be sent for a second level of review. This can include sending the imagery to one or more (human) experts, who may be located remotely from the loading facility. Here, the expert(s) would evaluate the imagery and provide their own assessment. They may do a live video call with a person at the facility if needed. In some instances, the secondary review could involve a request for additional imagery or other information.

Once the vehicle has passed pre-trip inspection and departed the depot, the onboard imagery and other stored information may be analyzed during the trip to identify whether any cargo has shifted (e.g., via forward, rearward, lateral or rotational movement of cargo) or there are other possible issues with the cargo (e.g., a strain gauge exceeds a threshold strain value). This can include automated monitoring using various types of sensors and vehicle information to detect issues with the cargo, securement devices or the vehicle itself.

By way of example, one or more cameras installed inside or along the trailer may monitor the cargo and/or the securement devices. Cameras on the tractor may be used to view different portions of the trailer. This approach is particularly beneficial for flatbed trucks because the cargo will be visible to cameras that are already installed as part of the autonomous vehicle. Alternatively or additionally, cameras installed inside a trailer can be used for enclosed freight such as in a dryvan or reefer.

in one scenario, the image processing happens at the vehicle, although it could also be done remotely, such as at the depot or elsewhere. On-vehicle processing may be preferred in many situations, since it Would not require transmitting image data over a cellular network to be processed, Which can introduce unwanted delays of seconds or longer. For instance, as a default the imagery may be processed on the vehicle. If there are any questions or ambiguities about the results obtained onboard, then such information may be sent to a remote site for further analysis.

By way of example only, a set of reference images could be stored locally at the vehicle showing how the cargo was secured prior to departing on the trip. This enables the onboard system to use one or more image processing algorithms when comparing real-time imagery against pre-trip imagery, detecting key point changes (e.g., using line or object analysis to identify movement of a cargo unit or restraint mechanism).

The image analysis can include using algorithms to see if cargo has shifted or moved (for instance in comparison to the initial pre-nip imagery). Markings on the floor and/or walls of the trailer could be used when determining whether there has been any shifting or movement by comparing the position of the cargo in images from different points in time relative to the markings. Alternatively or additionally, the imagery may focus on the securement devices to see if any have come loose or have broken. As noted above, the camera(s) may be connected to a remote facility (e.g., remote assistance or a depot) using the Internet via cell modem. However, for fast processing the algorithms for cargo monitoring would run on the edge (e.g., locally on the camera, at the trailer ECU, or on the processing system of the tractor, rather than uploading for remote processing). Here, the camera(s) may be connected to an onboard processing system via a communication link. While the Controller Area Network (CAN bus) of the vehicle could be used, in some instances a higher bandwidth communication link may be employed.

Figure 5A:
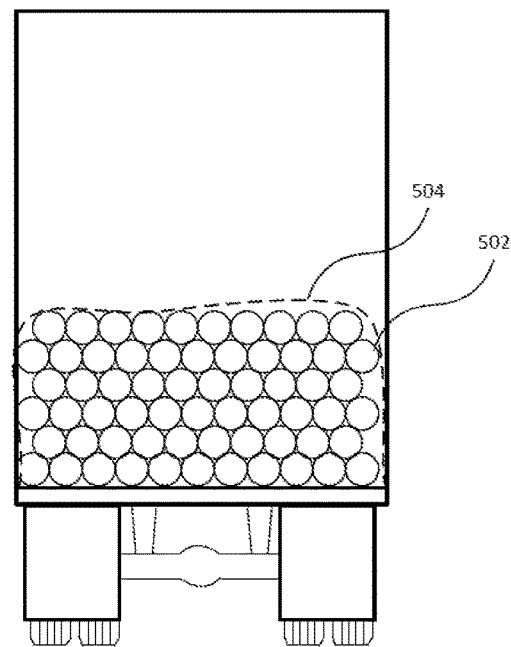
Figure 5B:
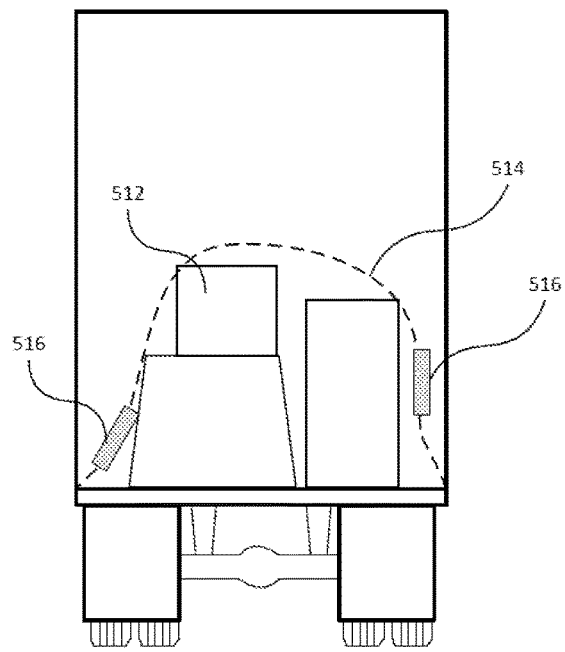

FIGS. 5A, 5B and 5C illustrate respective views 500, 510 and 520 of cargo secured to a truck. In particular, rear view 500 shows pipes 502 secured by a tie-down strap 504. Rear view 510 shows boxes or other containers 512 secured by a tie-down strap 514. As shown here, strain gauges 516 can be used to measure how loosely or securely the cargo is tied down to the vehicle. Similarly, as indicated by side view 520 each tie: down strap 522 may have a strain gauge type sensor 524 coupled to it.

Figure 5D:
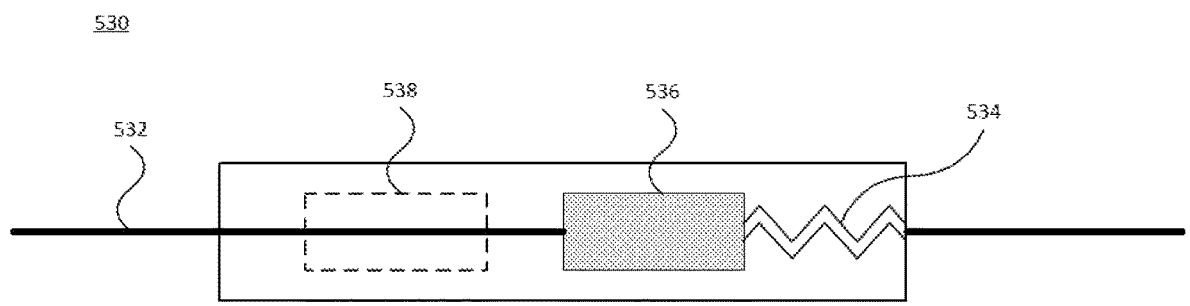

FIG. 5D illustrates a view of a strain gauge type sensor 530. Here, line 532 may be coupled to or integrated with a tie-down strap or other fastening mechanism. Spring-like element 534 is associates With tension in the line. Depending on the tension, visualization block 536 may be visible in a viewing window shown by dashed line 538. For instance, if the tension exceeds a predetermined threshold, the visualization block 536 is moved leftward and becomes visible in the viewing window; otherwise, the visualization block 536 may be hidden behind a cover (not shown). The visualization block 536 may be readily detectable by, e.g., an optical image sensor (camera). The visualization block 536 may have a specific color (e.g., red), pattern, shading, reflectivity, etc., to make it as visible as possible in the viewing window 538. It is possible that the amount of colored area shown is proportional to the tension in the rope. In addition, instead of a simple binary signal properly tensioned or not), such a mechanism would be able to indicate more fine-tuned tensioning information that can be captured by the camera (e.g., a percentage or range of tensions). Thus, a relatively simple computer vision algorithm may be employed to watch the sensors along the straps or other tie-down mechanisms and sound an alert if the tension of a sensor falls out of specification or exceeds a nominal value.

Similarly, devices used to measure the weight distribution of cargo throughout the trailer could be installed (e.g., using load cells or pressure sensors on the suspension), which can be tied back to the onboard processing system. These sensors are used to detect proper cargo placement before the trip is started in order to provide a set of baseline information (e.g., baseline cargo profile), and are also used to detect shifting of the load while driving. The system may also obtain sensor information regarding the pressures in the air suspension mechanisms on the vehicle. This information may be available on the CAN bus and comes from the brakes/ABS system, and can be used for detecting load shift.

These types of sensors could be connected physically to a computer for further processing (e.g., the onboard control system), for instance using a CAN bus for low-bandwidth sensors, or an Ethernet-type arrangement for higher bandwidth sensors cameras). In one example, instead of a physical connection the sensor module may be coupled to the onboard processing system using a wireless connection, such as a WiFi or Bluetooth™ type wireless link. And as noted above, a sensor such as a strain gauge may change color (or even shape), making it detectable by a camera, when the strain is too low or too high relative to some baseline value associated with a baseline cargo profile. Here, the physically-actuated sensor (e.g., a tension or pressure sensor) is not directly linked to the processing system: rather, another sensor such as a camera detects information from the physically-actuated sensor. In this case, the camera is the device that provides the physical sensor data (indirectly) to the processing system.

Visually obvious issues such as broken/loose tie-down strips, fires, smoke, displaced or missing cargo, etc. could be detected and flagged to a remote assistance team or automatically cause the vehicle to pull-over if the vehicle determines that it is unsafe to continue driving.

Different image evaluation algorithms might be employed depending on the nature of the trailer, cargo type and type of securement device. For instance, more robust algorithms could potentially determine how well the load is tied down and provide more advanced monitoring of the load. This can include analysis of the size, shape, color, etc. of the securement device or the cargo. For instance, information about the type and placement of the securement devices may be stored onboard as part of a pre-trip "snapshot" (e.g., a baseline cargo securement profile) of what the cargo setup looked like prior to travel.

In one scenario, if the trailer is closed or the vehicle is traveling in a low-light condition, a low-light algorithm (e.g., including the use of infrared illumination) could be employed. Here, cameras that perform well in low-light situations may be employed.

The image analysis can be done in conjunction with information from other sensor types. Such signals may be used as additional data points or checks against the imaging information. For instance, as noted above, weight or pressure distribution sensors can be used to determine the location or displacement of the cargo along a trailer. By way of example, the system may infer that cargo has shifted due to a change in vehicle dynamics (braking/steering response changes), a change in tire pressure on the trailer wheels, or a change in the pose of the tractor or the trailer.

For instance, FIGS. 6A and 6B illustrate two examples of a positional variance of the vehicle that may be due to shifting cargo or loosened securement devices. In example 600 of FIG. 6A, as the vehicle turns the system may expect a relatively tight turning radius. However, due to a problem with the cargo, the actual observed turning radius may be larger, resulting in a deviation $\Delta_1$. In example 610 of FIG. 6B, as the vehicle is driving along the roadway, the system may expect the trailer to move along a first trajectory in line with the tractor. Here, due to the lost or shifted cargo, the actual observed trailer trajectory may be wider or otherwise out of line with the tractor's trajectory, resulting in a deviation $\Delta_2$. The system may also predict the likelihood of a maneuvering problem along an upcoming section along the route based on such information. Such a prediction may also factor in other information, such as received weather data, topographical data froth onboard maps, etc., as well as how other vehicles have driven through or along a particular stretch of roadway. Here, tests may be performed in advance, e.g., in a controlled environment, to define performance thresholds or other operational criteria. This can be used to identify how much of a deviation $\Delta_1$ or $\Delta_2$ would be required before it is determined that there is a (potential) cargo shift or other situation.

Furthermore, the sensor information associated with the cargo could be compared to real time information about the route and/or roadway. Here, by way of example, the control algorithms would take into account the pose of the vehicle, in particular the orientation in space and velocity/acceleration. Given the dimensions of the vehicle, center of gravity, etc., the system can model how it should respond to control inputs—brakes, steering, throttle. One could even estimate the mass of the vehicle from observing its dynamic response to control inputs. Then if this estimated mass ever changes suddenly, for example, perhaps that means a piece of cargo fell off the trailer or suffered a significant change in position along the trailer.

Different weather conditions may also impact the mid-trip inspection process. For example, snow, sleet or ice may affect the cargo straps or suspension system generally, or individual strain gauge or load cell sensors). In this case, for different conditions the system may rely on different types of sensors. For example, when visibility is bad, the system could rely on weight sensors on the bed of the trailer. Alternatively or additionally, the system may include a database or lookup table for different types of securement devices, and the potential anomalies/errors to be checked for each type. Thus, the analysis may evaluate the obtained imagery by comparing cargo location, securement device information and/or other feature data against the data from the weight or pressure distribution sensors, for instance to pinpoint locations where pressure has shifted and how that correlates to actual or predicted displacement of the cargo.

Figure 7:
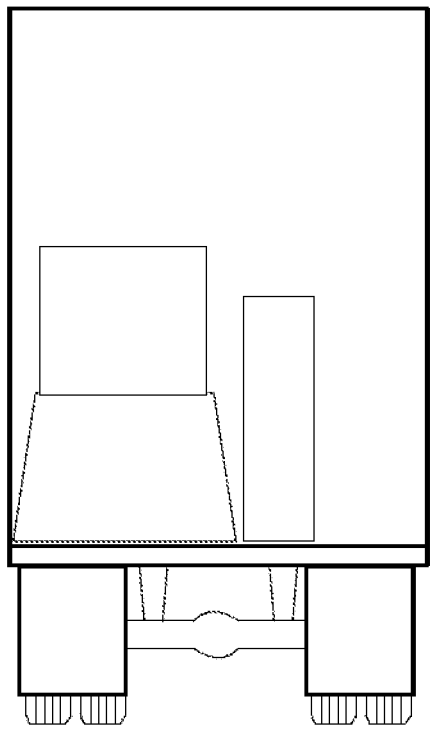
FIG. 7 illustrates an example cargo shifting scenario in accordance with aspects of the technology.
Figure 8:
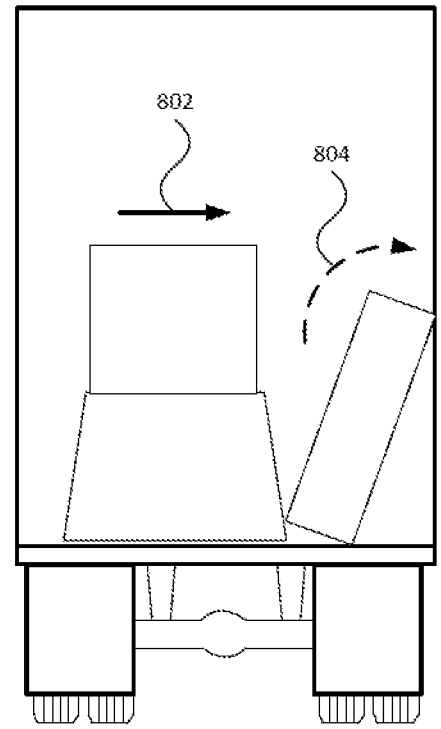
FIG. 8 illustrates another example cargo shifting scenario in accordance With aspects of the technology.

The additional information can be correlated with the imagery, for instance to see if a pallet has shifted to the side, tipped over or slid forward or backward along the trailer. For instance, FIG. 7 illustrates an image 700 of initial cargo positioning, for instance at the beginning of a trip. As shown in image 800 of FIG. 8, the cargo may shift as shown by solid arrow 802. The cargo may also tip, as shown by dashed arrow 804. The various sensor information may be used to identify what type of issue has occurred. Identification of the issue may be fed to the planner or other control module of the processing system in order to determine Whether the vehicle needs to pull over immediately, whether an adjustment should be made at an upcoming service area, Whether no action need be taken other than targeted monitoring of a particular securement device or portion of cargo, etc. This information may be provided to a human driver manually operating a truck. Thus, the approaches discussed herein can be used for both autonomous and manual driving modes.

The sensor information is desirably obtained while the vehicle is in operation, e.g., driving along a freeway or surface street. This may be done continuously, at regular intervals of time or distance (e.g., according to the relevant federal and state regulations), or upon occurrence of some situation during driving (e.g., hitting a pothole, prior to going around a curve or prior to an uphill or downhill grade, etc.). By way of example only, if a driving regulation requires cargo inspection every X miles (e.g., 100, 200 or 500 miles) or every Y hours (e.g., 4, 8 or 12 hours), then the system can obtain and evaluate sensor data at the necessary time or distance intervals.

If any deviation in the cargo or a securement device is detected, the vehicle could respond in different ways. In one example, the vehicle could send a signal to a remote assistance service, which would be able to view a live feed to determine if corrective action is needed. In another example, the onboard system (e.g., the planner module 223 of FIG. 2A) could initiate a corrective action depending on the nature of the issue. For instance, this could include (i) modifying driving behavior, (ii) re-routing to the nearest hub or other service area where the cargo can be re-secured, or (iii) pulling over as soon as it is safe to do so.

With regard to modifying driving behavior, in some cases the cargo shifting might be mitigated by either changing the route or driving style, or delaying action and waiting to see if the shilling resolves itself, stays the same or worsens. If the route has a lot of sharp turns, banks or slopes that might be causing cargo to move, the truck could re-route if another road option is feasible. If it is determined that the issue is due to environmental conditions such as high winds causing trailer movement (high winds can cause a trailer to roll over), the truck might pull over in a way to minimize the risk and wait out the high winds. If driving slower and braking at a lower rate of deceleration might be the solution, then the truck might adjust its driving style accordingly.

With regard to re-routing for cargo re-securement, the track may take measures such as slowing down its speed and alerting the necessary agencies proactively. And with regard pulling over, in the worst case the truck might pull over as soon as possible and wait for roadside assistance. For example, a remote operations team could inform roadside assistance about the nature of the issue with cargo securement, so that roadside assistance can then bring the right equipment to troubleshoot and rectify as needed.

In addition, the securement issue can be used as a learning experience. For example, a detailed investigation of the issue may be undertaken after it has been resolved (including readings from various sensors and whether correction actions actually resolved the issue). This knowledge could be added to a central database and possibly disseminated to a fleet of vehicles. The entire fleet would benefit from this knowledge.

Figure 9A:
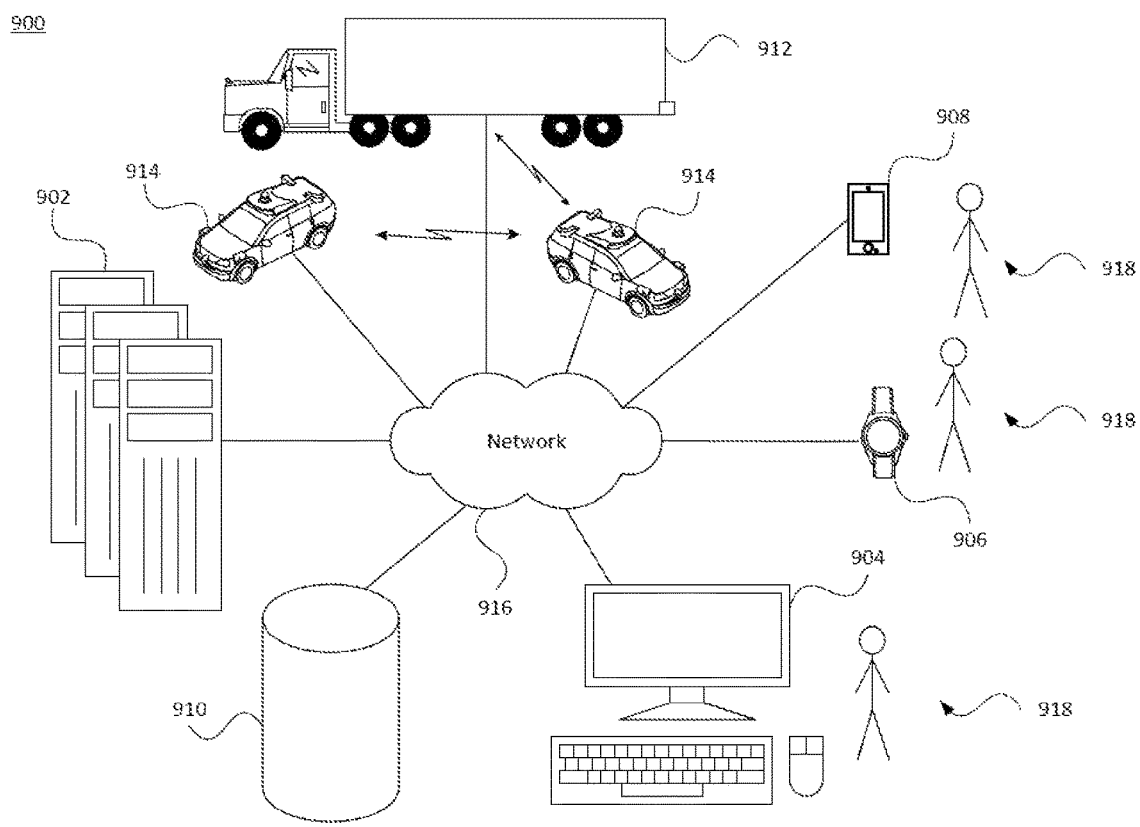
FIGS. 9A-B illustrates an example system in accordance with aspects of the technology.
Figure 9B:
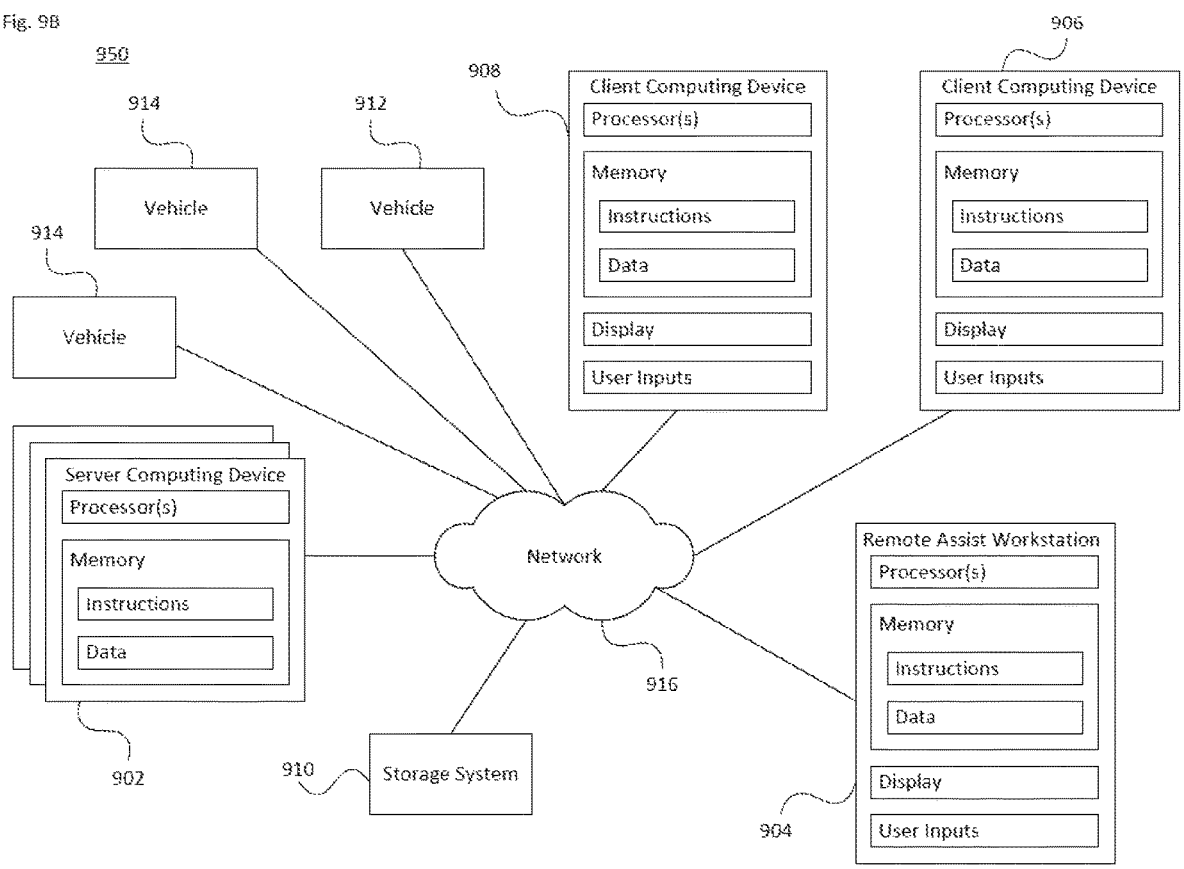

One example of information sharing is shown in FIGS. 9A and 9B. In particular, FIG. 9A is a pictorial diagram 900 and FIG. 9B is a functional diagram 950 of an example system that includes a plurality of computing, devices 902, 904, 906, 908 and a storage system 910 connected via a network 916. The system also includes cargo vehicles 912, which may be configured the same as or similarly to vehicle 100 of FIGS. 1A-B, as well as other vehicles 914. Vehicles 912 and/or vehicles 914 may be part of a fleet of vehicles. Although only a few vehicles and computing devices are depicted for simplicity, a typical system may include significantly more.

As shown in FIG. 9B, each of computing devices 902, 904, 906 and 908 may include one or more processors, memory, data and instructions. Such processors, memories, data and instructions may be configured similarly to the ones described above with regard to FIG. 2A.

The various computing devices and vehicles may communicate via one or more networks, such as network 916. The network 916, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm, that exchange information with different nodes of a network for the purpose of receiving, processing and transmitting the data to and from other computing devices. For instance, computing device 902 may include one or more server computing devices that are Capable of communicating with the computing devices of vehicles 912 and/or 914, as well as computing devices 904, 906 and 908 via the network 916. For example, vehicles 912 and/or 914 may be a part of a fleet of vehicles that can be dispatched by a server computing device to various locations. In this regard, the computing device 902 may function as a dispatching server computing system which can be used to dispatch vehicles to different locations in order to pick up and deliver cargo or pick up and drop cuff passengers. In addition, server computing device 902 may use network 916 to transmit and present information to a user of one of the other computing devices or a passenger of a vehicle. In this regard, computing devices 904, 906 and 908 may be considered client computing devices.

As shown in FIG. 9A each client computing device 904, 906 and 908 may be a personal computing device intended for use by a respective user 918, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 906 and 908 may be mobile phones or devices such as a wireless-enabled PDA, a tablet PC, a wearable computing device (e.g., a smartwatch), or a netbook that is capable of obtaining information via the Internet or other networks.

In some examples, client computing device 904 may be a remote assistance workstation used by an administrator or operator to communicate with passengers of dispatched vehicles. Although only a single remote assistance workstation 904 is shown in FIGS. 9A-9B, any number of such work stations may be included in a given system. Moreover, although the operations work station is depicted as a desktop-type computer, operations workstations may include various types of personal computing devices such as laptops, netbooks, tablet Computers, etc.

Remote assistance may be used to evaluate Whether cargo is properly secured prior to leaving a depot or other facility. It may also be used to supplement or replace onboard image processing or other data processing. For instance, as noted above, when it is not clear whether there is a problem with a securement device, or whether cargo has shifted beyond a threshold amount, remote assistance may perform additional analysis on the imagery and other sensor data. Here, the back-end system may have access to a larger database of already obtained imagery from different vehicles of the fleet than what is maintained onboard a vehicle on a trip.

In a situation where there is a passenger or remote assistance personnel (e.g., a safety driver or fleet response team member), the vehicle or remote assistance workstation may communicate directly or indirectly with the person's client computing device. Here, for example, information may be provided to the passenger or remote assistance personnel regarding current driving operations, changes to the route in response to the situation, etc. The passenger or remote assistance personnel may then provide instructions to the vehicle and/or take over some or all of the driving operations for a particular period of time, such as until the cargo is re secured or until the trip is complete.

Storage system 910 can be of any type of computerized storage capable of storing information accessible by the server computing devices 1202, such as a hard-drive, memory card, ROM, RAM, DVD, CD-ROM, flash drive and/or tape drive. In addition, storage system 910 may include a distributed storage system where data is stored on a plurality of different storage devices which may be physically located at the same or different geographic locations. Storage system 910 may be connected to the computing devices via the network 916 as shown in FIGS. 9A-B, and/or may be directly connected to or incorporated into any of the computing devices.

Storage system 910 may store various types of information. For instance, the storage system 910 may maintain autonomous vehicle control software which is to be used by vehicles, such as vehicles 912 or 914, to operate such vehicles in an autonomous driving mode. It may store vehicle model information for each type of vehicle in the fleet, such as a kinematic model for both the tractor and trailer(s). It may also store map information, route information, weather information, etc. As with the onboard systems, the storage system 910 may include reference data and received trip data from the vehicles in the fleet. The reference data may include reference images or other information regarding proper (or improper') cargo configurations and conditions to be used for third-trip cargo monitoring. By way of example, the reference images may be taken at the facility at which the cargo was loaded onto a given vehicle or into a closed container. The trip data can include real-time data regarding the cargo, securement devices and other vehicle information obtained during a trip for the given vehicle. This can include information about securement devices used to secure the cargo, image data for the cargo, securement devices and/or areas of the trailer, and the like.

Such information may be shared with the vehicles 912 and 914, for instance to help with real-time route planning and traction analysis by the onboard computer system(s). The remote assistance workstation 904 may access the stored information and use it to assist operation of a single vehicle or a fleet of vehicles.

FIG. 10 illustrates one example of a method 1000 of performing cargo evaluation for an autonomous vehicle. During and/or after loading of the cargo, as shown in block 1002, the method includes receiving sensor information regarding at least one of cargo arrangement or cargo securement of cargo on the autonomous vehicle. The received sensor information includes imagery of at least one of the cargo or a securement mechanism. At block 1004, the method includes evaluating, by one or more processors, the received sensor information to determine whether the cargo arrangement or the cargo securement falls within a target threshold. The one or more processors may be, e.g., part of the onboard processing system of the vehicle (see 202 of FIG. 2A), part of a control center of the loading facility (see 454 of FIG. 4B), or part of a back end system that may include remote assistance (see 902 and 904 of FIGS. 9A-B). At block 1006, in response to the cargo arrangement or the cargo securement within the target threshold, the one or more processors are configured to generate a baseline cargo profile based on the received sensor information. And as shown in block 1008, the baseline cargo profile is configured to be stored in memory of the autonomous vehicle for in-trip evaluation against real time data.

FIG. 11 illustrates an example of another method 1100 of performing cargo monitoring for a vehicle. As shown in block 1102, the method includes obtaining, by one or more processors of the vehicle, a baseline cargo securement profile for cargo stored in a cargo section of the vehicle. At block 1104, the method includes receiving, by the one or more processors during driving of the vehicle, sensor information regarding at least one of a cargo arrangement or a cargo securement along the cargo section of the vehicle. The received sensor information includes imagery of at least one of the cargo or a securement mechanism. At block 1106, the method includes comparing, by the one or more processors, the received sensor information against the baseline cargo securement profile. At block 1108, the method includes determining by the one or more processors based on the comparing, whether at least a portion of the cargo has changed position and is no longer secured according to a threshold securement requirement. And at block 1110, upon determining that the threshold securement requirement is exceeded, the one or more processors cause the vehicle to take a corrective action.

As noted above, the approaches discussed herein can be used for both autonomous and manual driving modes.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of

The invention claimed is:

1. A method of performing cargo evaluation for a vehicle configured to operate in an autonomous driving mode, the method comprising:
evaluating, by one or more processors, information regarding at least one of a cargo arrangement or cargo securement of cargo on the vehicle configured to be operated in the autonomous driving mode, to determine whether the cargo arrangement or the cargo securement falls within a target threshold, the evaluating including generating a confidence value of whether the cargo is properly secured;
in response to the cargo arrangement or the cargo securement not falling within the target threshold based on the confidence value, determining by the one or more processors whether to make a specific adjustment to a securement mechanism of the vehicle; and
in response to the cargo arrangement or the cargo securement falling within the target threshold based on the confidence value, generating, by the one or more processors, a baseline cargo profile for use during a trip to be performed by the vehicle when operating in the autonomous driving mode.

2. The method of claim 1, wherein upon determining to make the specific adjustment to the securement mechanism of the vehicle, the one or more processors requesting the specific adjustment be made to the securement mechanism of the vehicle.

3. The method of claim 1, wherein when the determining does not identify any specific adjustment, the method further includes sending at least a portion of the information for a second-tier review.

4. The method of claim 3, wherein the at least the portion of the information includes imagery of at least one of the cargo or the securement mechanism.

5. The method of claim 3, wherein the at least the portion of the information is sent for the second-tier review when the confidence value is below a given threshold although the target threshold is satisfied.

6. The method of claim 3, wherein sending at least the portion of the information for a second-tier review includes sending the portion of the information to a cargo loading facility.

7. The method of claim 3, wherein sending at least the portion of the information for a second-tier review includes sending the portion of the information to remote assistance.

8. The method of claim 1, wherein the baseline cargo profile is configured to be stored in memory of the vehicle for in-trip evaluation against real time data.

9. The method of claim 1, wherein evaluating the information includes the one or more processors issuing inspection information to the vehicle so that the vehicle is able to undergo inspection at a cargo loading facility.

10. The method of claim 1, further comprising the one or more processors causing a sensor suite of a cargo facility to capture the information regarding at least one of the cargo arrangement or cargo securement of the cargo on the vehicle.

11. The method of claim 1, wherein evaluating the information includes determining whether the cargo arrangement has a set of dimensions that does not exceed a regulation.

12. A method of performing cargo monitoring for a vehicle configured to operate in an autonomous driving mode, the method comprising:
receiving, by one or more processors of the vehicle during operation in the autonomous mode, sensor information regarding at least one of a cargo arrangement or a cargo securement of cargo along a cargo section of the vehicle;
correlating the received sensor information with one or more vehicle signals, the one or more vehicle signals including a change in vehicle dynamics, a change in a suspension mechanism, a change in tire pressure of at least one tire, or a change in vehicle pose;
determining by the one or more processors based on the correlating, whether at least a portion of the cargo is no longer secured according to a threshold securement requirement; and
upon determining that at least the portion of the cargo is no longer secured, the one or more processors causing the vehicle to take a corrective action while operating in the autonomous driving mode.

13. The method of claim 12, wherein the correlating further includes evaluating the received sensor information against a baseline cargo securement profile.

14. The method of claim 13, wherein the baseline cargo securement profile is either:
obtained prior to departure of the vehicle on a trip; or
obtained from a loading depot at which the cargo was loaded.

15. The method of claim 12, wherein the corrective action includes one or more of (i) modifying a driving behavior of the vehicle, (ii) re-routing the vehicle to a location at which the cargo can be re-secured, (iii) pulling the vehicle over, or (iv) contacting a remote assistance service.

16. The method of claim 12, wherein determining whether at least a portion of the cargo is no longer secured according to a threshold securement requirement includes determining that the portion of the cargo has either shifted in a particular direction or has tipped.

17. The method of claim 12, wherein the sensor information includes one or more of (i) weight distribution information, (ii) pressure distribution information, (iii) strain of a cargo securement mechanism, (iv) tension of the cargo securement mechanism, or (v) imagery of at least one of the cargo or the cargo securement mechanism.

18. The method of claim 12, wherein correlating the received sensor information with the one or more vehicle signals includes estimating the mass of the vehicle.

19. The method of claim 12, wherein correlating the received sensor information with the one or more vehicle signals is based on a weather condition experienced by the vehicle.

20. The method of claim 12, wherein correlating the received sensor information with the one or more vehicle signals is based on anomalies or errors to be checked for different types of cargo securement mechanisms.

21. A vehicle configured to operate in an autonomous driving mode, comprising:
a driving system including a steering subsystem, an acceleration subsystem and a deceleration subsystem to control driving of the vehicle in the autonomous driving mode;

a perception system including a plurality of sensors, each of the plurality of sensors being positioned along the vehicle; and a control system operatively connected to the driving system and the perception system, the control system having one or more computer processors configured to:

receive, during operation in the autonomous mode, sensor information regarding at least one of a cargo arrangement or a cargo securement of cargo along a cargo section of the vehicle;

correlate the received sensor information with one or more vehicle signals, the one or more vehicle signals including a change in vehicle dynamics, a change in a suspension mechanism, a change in tire pressure of at least one tire, or a change in vehicle pose;

determine, based on the correlation, whether at least a portion of the cargo is no longer secured according to a threshold securement requirement; and upon determining that at least the portion of the cargo is no longer secured, cause the vehicle to take a corrective action while operating in the autonomous driving mode.

\* \* \* \* \*